UNITED STATES PATENT OFFICE 2,613,229

HYDROXYPENTACHLORODIMETHOXY-METHANOTETRAHYDROINDANE

Willard J. Croxall, Bryn Athyn, Pa., and John W. Dawson, Huntsville, Ala., assignors to Rohm & Haas Company, Philadelphia, Pa., a corporation of Delaware No Drawing. Application December 9, 1950, Serial No. 200,088

1 Claim. (Cl. 260—611)

This invention deals with 2-hydroxy-1,4,5,6,7-pentachloro - 8,8 - dimethoxy - 4,7 - methano-$3a,4,7,7a$-tetrahydroindane and with a method for its preparation.

In our application Serial No. 100,766, filed June 22, 1949, now U. S. Patent No. 2,562,893, issued August 7, 1951, of which the present application is a continuation-in-part, it is shown that hexachlorocyclopentadiene reacts with an alcohol, ROH, in the presence of a strong alkali to form 1,1 - dialkoxy - 2,3,4,5-tetrachlorocyclopentadiene and that this dialkoxy compound reacts by adding to cyclopentadiene to form 4,5,6,7-tetrachloro - 4,7 - methano - 8,8 - dialkoxy - $3a,4,7,7a$-tetrahydroindene. In the above formula R is a monovalent hydrocarbon group, particularly a non-tertiary alkyl group of not over eight carbon atoms. In our above-identified application tetrachloromethanodialkoxytetrahydroindene is reacted with chlorine to form hexachloromethanodialkoxytetrahydroindane, which is a potent insecticidal agent against flies, roaches, and various other insects.

We have now found that when 4,5,6,7-tetrachloro - 4,7 - methano - 8,8-dimethoxy-$3a,4,7,7a$-tetrahydroindene is reacted with an aqueous solution of hypochlorous acid between about 25° C. and 75° C., there is formed the 2-hydroxypentachloro indane derivative. While this new compound resembles our hexachloro compound in some respects, it possesses, rather surprisingly, properties not exhibited by the hexachloro compound. Furthermore, through the hydroxyl group of the compound of this invention there are formed acyl derivatives by reaction with carboxylic anhydrides or acid halides or phosphites or phosphates by reaction with phosphorus compounds such as phosphorous chloride or bromide, phosphorous sulfides, phosphoryl halides such as diethylphosphoryl chloride, etc. The compound of this invention is thus a valuable chemical intermediate.

For the preparation of this compound there may be taken as a starting material hexachlorocyclopentadiene. This is reacted between 0° C. and 60° C. with methyl alcohol, usually in excess, in the presence of about two molar proportions of an alkali hydroxide per mole of hexachlorocyclopentadiene. Any excess alkali is neutralized and the dimethoxytetrachlorocyclopentadiene formed is separated by distillation at low pressure. A similar reaction can be effected with other alcohols.

The above dimethoxy compound is reacted with cyclopentadiene, conveniently in an inert organic solvent boiling from about 80° C. to 150° C., such as benzene, toluene, xylene, or naphtha. It is desirable to have present in the reaction mixture a polymerization inhibitor, such as hydroquinone or naphthol, an amount of inhibitor from 0.01% to 5% of the weight of reactants being suitable. The reaction mixture is stirred and heated at 50° C. to 100° C. and then separated by distillation. The product is tetrachlorodimethoxymethanotetrahydroindene.

This is reacted with hypochlorous acid. The reaction is effected by stirring together a solution of the above product in an organic solvent with an aqueous solution containing from about 2% to 7% of hypochlorous acid. The mixture is warmed to promote the reaction and continued until the reaction is reasonably complete. The organic layer is then separated, washed with water, and distilled.

A typical preparation follows. Parts shown are by weight.

Example (a) Potassium hydroxide in an amount of 123.5 parts (2.2 moles) is dissolved in 256 parts (8 moles) of methanol and the solution added slowly over three hours to a well-stirred suspension of 272.5 parts (1.0 mole) of hexachlorocyclopentadiene in 126 parts (4.0 moles) of methanol at 5° C.–10° C. After addition is complete, the reaction mixture is allowed to come to room temperature while being stirred over four hours. Stirring is continued overnight. The reaction mixture is brought to neutrality by the addition of 12N hydrochloric acid and filtered. The potassium chloride separated is washed with acetone and the washings added to the filtrate. The liquors are stripped of solvent and distilled in vacuo to give a 90% yield of 1,1-dimethoxy-2,3,4,5-tetrachlorocyclopentadiene, distilling at 79°–82° C./0.5 mm. This product has a refractive index, $n_D^{30}$, of 1.5282, and contains 53.88% of chlorine (theory 53.80%).

(b) There are dissolved 264 parts (1 mole) of this compound and 2 parts of di-beta-naphthol in 200 parts of toluene and the mixture is heated to reflux temperature. Sixty-six parts (1.0 mole) of cyclopentadiene are introduced below the surface over four hours to the well-stirred, refluxing toluene solution. Stirring and heating are continued for 30 minutes. The reaction mixture is stripped of solvent and distilled in vacuo giving a 75% yield of 4,5,6,7-tetrachloro-4,7-endomethylene - 8,8 - dialkoxy - $3a,4,7,7a$ - tetrahydroindene distilling at 114° C./0.5 mm.

(c) A solution of 495 parts of the above product was prepared in 630 parts of ethylene dichloride. Thereto was added 1000 parts of an aqueous 4% hypochlorous acid solution prepared according to the method given in Collective Volume I of Organic Syntheses at page 158. The mixture was vigorously stirred and warmed to about 37° C. and then to 50° C. The aqueous layer was drawn off and replaced with a second portion of 1000 parts of the hypochlorite solution and the mixture stirred with warming. This was repeated twice again with 1000-part portions of hypochlorous acid solution. The whole operation required six hours. The organic layer was then thoroughly washed with water, stripped of solvent, and distilled at low pressure. After a forerun of 34 parts up to 170° C./2.5 mm., there was taken a fraction at 168° C./1.5 mm. to 174/ C.1 mm. which had a refractive index at 20° C. of 1.5540. Another fraction was then taken between 168° C./1 mm. and 188° C./1.5 mm. which had a refractive index of 1.5550. Both fractions proved to be essentially a compound corresponding in composition to 2-hydroxy-1,4,5,6,7-pentachloro-8,8-dimethoxy - 4,7 - methano - 3$a$,4,7,7$a$-tetrahydroindane or to the isomer in which hydroxyl group and chlorine atom are interchanged. Analyses showed a carbon content of 37.7% and a hydrogen content of 3.2% (theory 37.7% and 3.4% respectively).

This compound was mixed with a finely divided solid diluent or carrier and a wetting agent to give a wettable powder. The powder was tested against armyworm at 1:100, giving an 80% kill.

A 2% solution was made in deodorized kerosene. It was applied against roaches. A one cc. dose under standard test conditions gave a 100% kill and a 0.6 cc. dose a 70% kill. A one cc. dose of a 1% solution gave a 92% kill and of a 0.5% solution a 90% kill.

While a 2% solution in kerosene did not give knockdown in the Peet-Grady test, a combination spray containing 2% of the above compound and 1% of butoxyethoxyethyl thiocyanate gave a knockdown of 96% and a kill of +55 compared to the Official Test Insecticide.

A self-emulsifiable composition was prepared from one part of the above compound, two parts of aromatic solvent, and one part of a non-ionic emulsifier. This was used in a spray in water at a dilution of 1:400, 1:800, and 1:1600 (on the basis of the compound). Kills of aphids were 94%, 91%, and 93% respectively. These tests and others demonstrate that the above compound is a very effective aphicide.

The probable structure of the compound prepared above is:

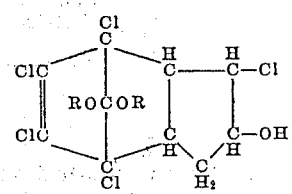

We claim:

A hydroxypentachloro - 8,8 - dimethoxy - 4,7-methano-3$a$,4,7,7$a$-tetrahydroindane, obtained by reacting together 1,1-dimethoxy-2,3,4,5-tetrachlorocyclopentadiene and cyclopentadiene, whereby 4,5,6,7-tetrachloro-4,7-methano-8,8-dimethoxy-3$a$,4,7,7$a$-tetrahydroindene is formed, and reacting this compound with an aqueous solution of hypochlorous acid.

WILLARD J. CROXALL.
JOHN W. DAWSON.

REFERENCES CITED

The following references are of record in the file of this patent:

UNITED STATES PATENTS

| Number | Name | Date |
|---|---|---|
| 2,562,893 | Dawson et al. (I) | Aug. 7, 1951 |
| 2,588,215 | Dawson et al. (II) | Mar. 4, 1952 |